Mar. 3, 1925.  1,528,140
C. W. WINTHER
SPOKE TIGHTENER
Filed March 26, 1923   2 Sheets-Sheet 1
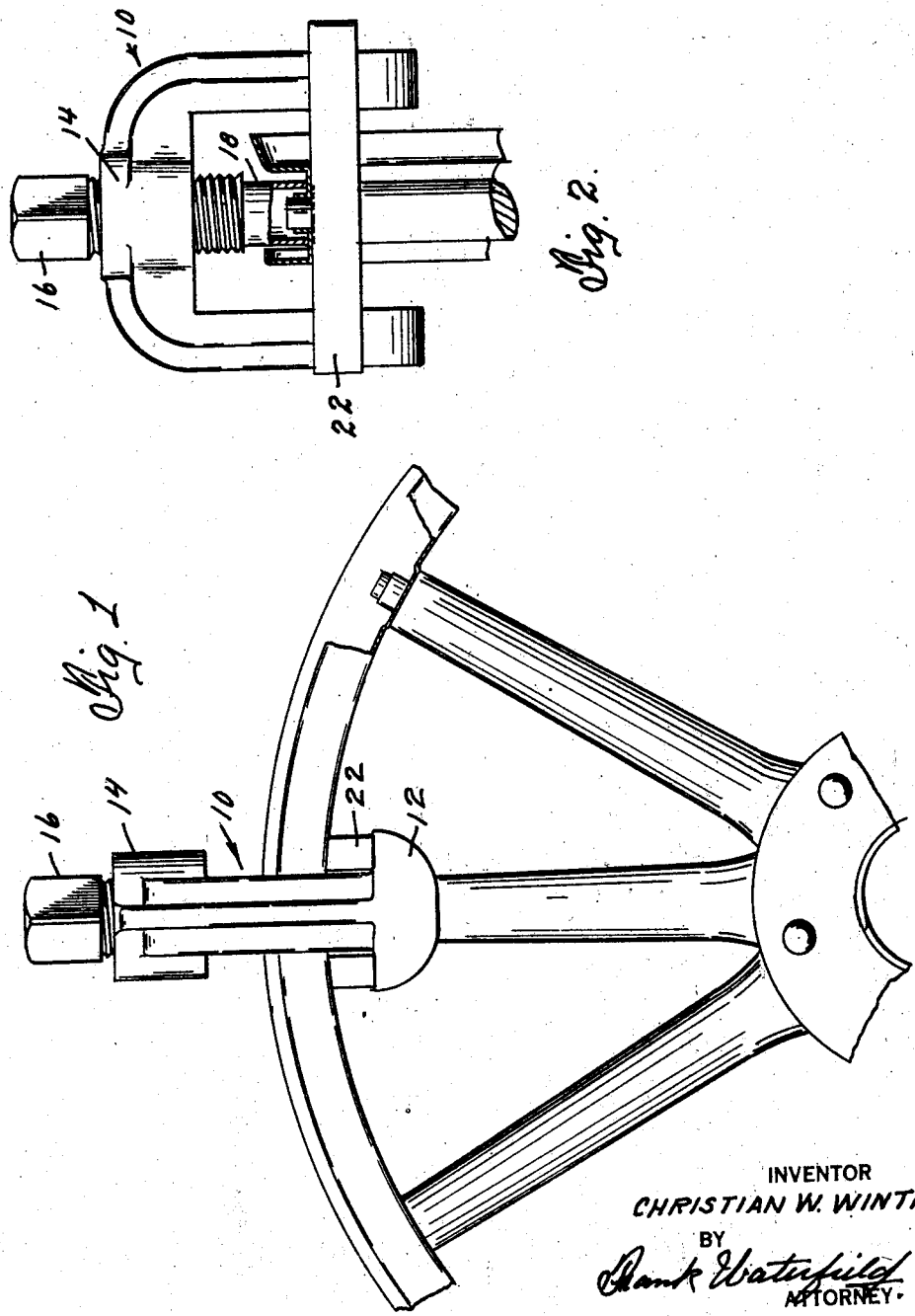
INVENTOR
CHRISTIAN W. WINTHER
BY
ATTORNEY.

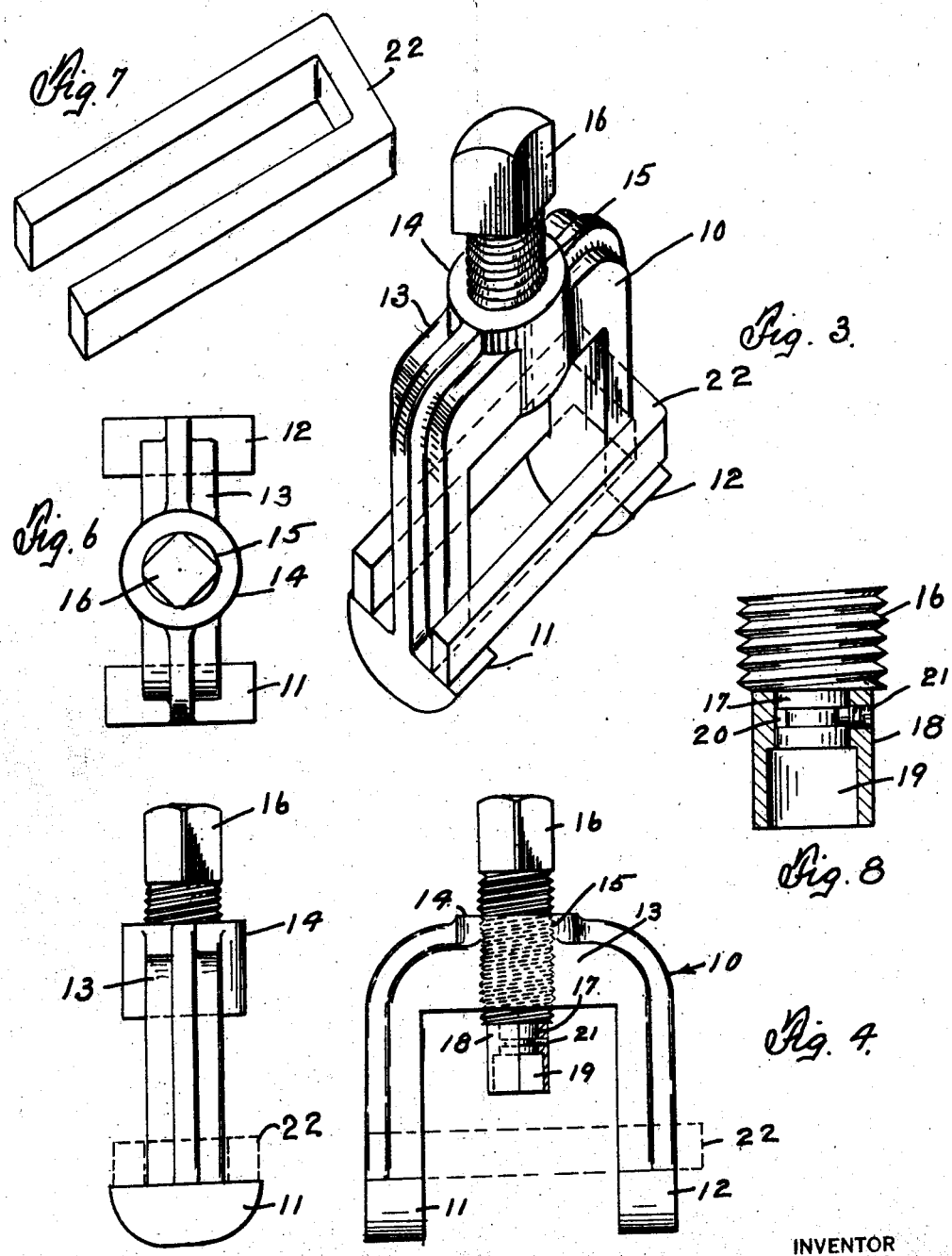

Patented Mar. 3, 1925.

1,528,140

UNITED STATES PATENT OFFICE.

CHRISTIAN W. WINTHER, OF FRESNO, CALIFORNIA.

SPOKE TIGHTENER.

Application filed March 26, 1923. Serial No. 627,756.

*To all whom it may concern:*

Be it known that I, CHRISTIAN W. WINTHER, a citizen of the United States, and resident of Fresno, in the county of Fresno, State of California, have invented certain new and useful Improvements in Spoke Tighteners, of which the following is a specification.

My device relates primarily to a device for tightening spokes of wheels of auto-vehicles and the like provided with steel felloes and wooden spokes. In the use of vehicle wheels having steel felloes and wooden spokes it has developed that in use during the hot weather the spokes have dried up or shrunk resulting in a shortening thereof thus resulting in the spoke pulling away from the felloe and causing an annoying rattle and the liability of the wheel to collapse.

It is the object of my invention to provide a device by means of which the metal forming the rim at the point where the spoke abuts against the inner side of the rim can be depressed or forced inwardly against the outer end of the spoke, thereby forming a tight joint therebetween and overcoming the aforementioned disadvantages.

Another object is to provide a cheap, simple and efficient device for the above purpose.

A still further object is to provide a device of the above character which may be carried in the tool box and which may be used without removing the wheel from its place of use.

Other objects and advantages will appear hereinafter and, while I have shown and will describe the preferred form of my invention, I wish it understood that I do not limit myself to such preferred form but that various changes and adaptations may be made therein without departing from the spirit of my invention.

In the drawings accompanying and forming a part hereof

Figure 1 is a side elevation, partly broken away, of a fragment of a vehicle wheel showing my device in position thereon ready for use and also showing its effect.

Fig. 2 is a transverse section of a fragment of a wheel showing my device in operation thereon, partly broken away for clearness of illustration.

Fig. 3 is a perspective view of my device as it appears when positioned for use, with the wheel omitted.

Fig. 4 is a side elevation of the body of my device.

Fig. 5 is an end elevation of Fig. 4.

Fig. 6 is a top plan of Fig. 5.

Fig. 7 is a perspective view of the lock used with my device.

Fig. 8 is an enlarged fragmentary detail, partly in elevation, of a portion of my device.

Referring to the drawings, my device comprises a substantially inverted U-shaped body member 10 the free ends of the legs of which terminate in substantially T-shaped heads 11 and 12. Provided centrally of the cross member 13 of body member 10, to extend parallel with the legs thereof, is a boss 14 centrally of which is provided a screw-threaded opening 15 in which is mounted the operating screw 16 in threaded engagement therewith. The lower end 17 of screw 16 is reduced in size and revolubly mounted on this reduced end is a die 18 provided at its lower end with an aperture 19. The lower end 17 of screw 16 is provided centrally of its length with an annular groove 20 and provided in die 18 is a holding screw 21 the end of which is adapted to project into groove 20 to hold die 18 positioned for use. It will be understood that various sizes of dies 18 will be provided to suit various sizes of rims upon which the device is to be used, the aperture 19 being varied accordingly.

As shown in Fig. 7, my locking member comprises a substantially U-shaped member 22 which is of a size and configuration such that the longer legs will straddle the legs of the body member 10 and rest upon the upper face of the heads 11 and 12, as best shown in Fig. 3 and in dotted lines in Figs. 4 and 5.

In the operation of my device the screw 16 will first be rotated to elevate die 18 to the desired height; the device will then be mounted upon a rim with the legs thereof on opposite sides of the felloe and parallel with the spoke it is desired to tighten; the aperture 19 in the die 18 will then be positioned to surround the end 23 of the spoke 24; the lock 22 will then be passed under the rim to straddle the legs of body member 10 and the spoke 24, as best shown in Figs. 1 and 2, and permitted to rest upon the upper faces of heads 11 and 12; screw 16 will then be rotated downwardly until member 22 bears against the under side of the felloe, and die 18 bears against the upper side. Further downward movement of screw 16 will cause die 18 to force the metal of the felloe at the outer end of the spoke downwardly until the same abuts rigidly against the spoke. By rotating screw 16 in a reverse direction the pressure will be released, lock 22 can be removed, and the device moved to another place of use.

Having described my invention what I claim is:

1. A spoke tightening device comprising a substantially U-shaped body member adapted to be mounted to extend transversely of a felloe and having the free ends of the legs thereof terminating in heads; a locking member adapted to straddle said legs beneath said felloe; a die carried by said body member adapted to be moved toward or away from said felloe to press the metal forming said felloe downwardly into contact with the end of a spoke.

2. A spoke tightener comprising a substantially inverted U-shaped body member having the free ends of the legs thereof terminating in heads adapted to be mounted to straddle the felloe of a wheel with said free ends extending radially and inwardly; a substantially U-shaped locking member adapted to be mounted to straddle the free ends of said body member to rest upon said heads at the inner side of the felloe; a screw revolubly mounted in said body member to extend parallel with the legs thereof; a hollow die revolubly mounted on the free end of said screw adapted to bear against the outer face of the felloe.

3. A spoke tightener for use with wheels having steel felloes and wooden spokes comprising a U-shaped body member adapted to be mounted upon said felloe, the free ends of the legs thereof extending radially on opposite sides thereof; a locking member adapted to be mounted to straddle said legs and a spoke beneath said felloe; a screw revolubly mounted in said body member centrally thereof and extending parallel with said legs; a die carried by said screw adapted to engage the portion of said felloe surrounding the upper end of said spoke, whereby when said screw is rotated downwardly said locking member will engage the inner face of the felloe and said die will force the portion of the felloe engaged thereby downwardly into contact with the end of said spoke.

4. A spoke tightener comprising a body member adapted to be mounted upon the felloe of a wheel to straddle the same transversely; means adapted to be mounted between the under side of said felloe and said body member; an operating screw mounted in said body member to extend radially of said felloe when positioned for use; a die detachably mounted upon the lower end of said screw, whereby when said screw is rotated said die will act to depress a portion of said felloe downwardly.

5. A spoke tightening device comprising a body member adapted to be mounted to straddle a felloe; a locking member adapted to straddle said body member beneath said felloe; supporting means for said locking member carried by said body member; a die detachably mounted in said body member adapted to be moved towards or away from said felloe to press the metal forming said felloe into contact with a spoke.

6. A spoke tightener comprising a body member adapted to be mounted to straddle the felloe of a wheel transversely thereof; a locking member, adapted to straddle said body member and a spoke of said wheel beneath the felloe and being supported by said body member, adapted to engage the under side of said felloe to prevent upward movement of said body member; a die carried by said body member adapted to be moved towards or away from said felloe to press the metal forming the same into contact with the end of said spoke.

7. A spoke tightening device comprising a body member adapted to be mounted to straddle the felloe of a wheel transversely; a locking member adapted to be mounted upon said body member beneath said felloe to limit upward movement of said body member relative to said wheel; a die carried by said body member adapted to be moved towards or away from said felloe to press the metal forming the same into contact with the end of said spoke.

In witness that I claim the foregoing I have hereunto set my hand this 15th day of March, 1922.

CHRISTIAN W. WINTHER.